March 5, 1935.  C. W. TOWT  1,993,635
APPARATUS FOR PREVENTING DAMAGE TO VEGETATION
BY FROSTING AND SUNBURNING TEMPERATURES
Original Filed Aug. 8, 1933   3 Sheets-Sheet 1
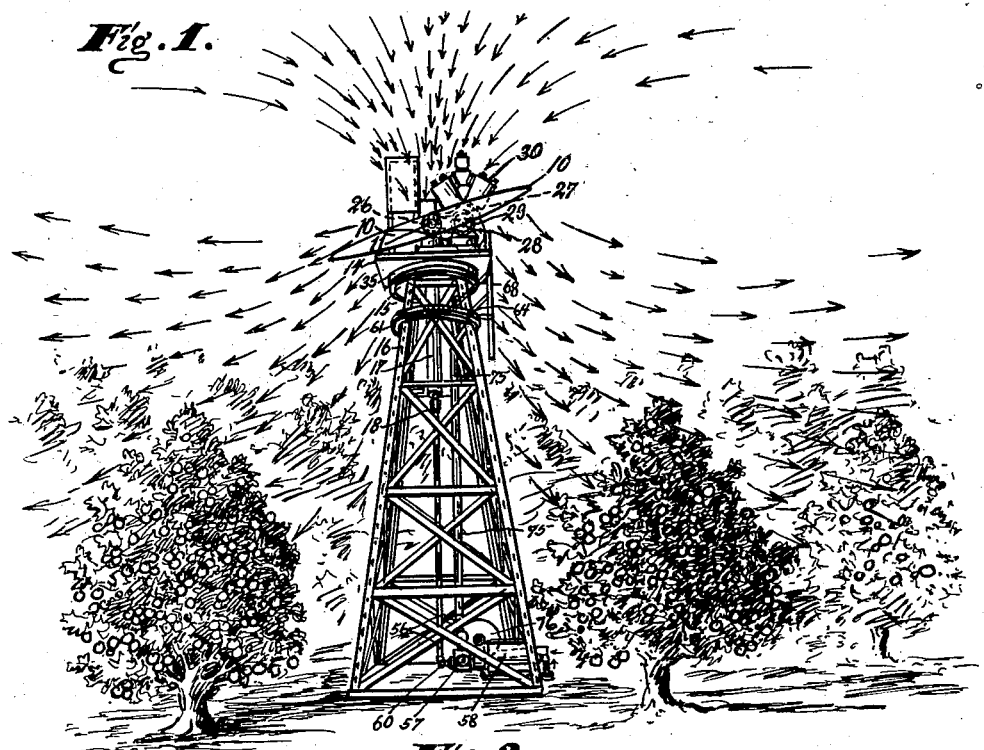
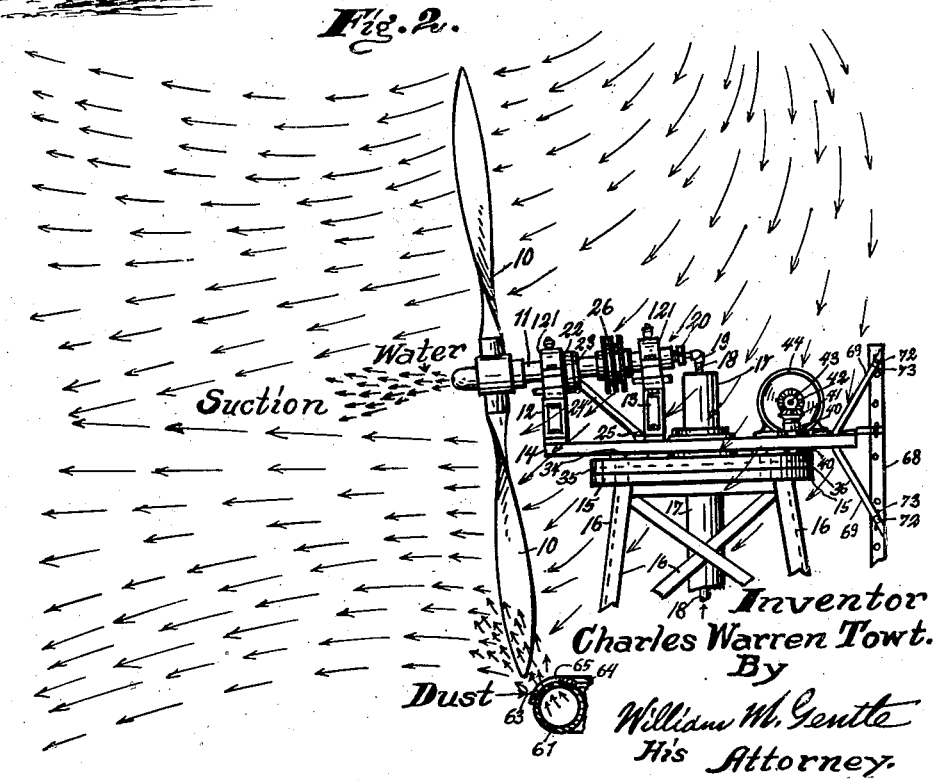

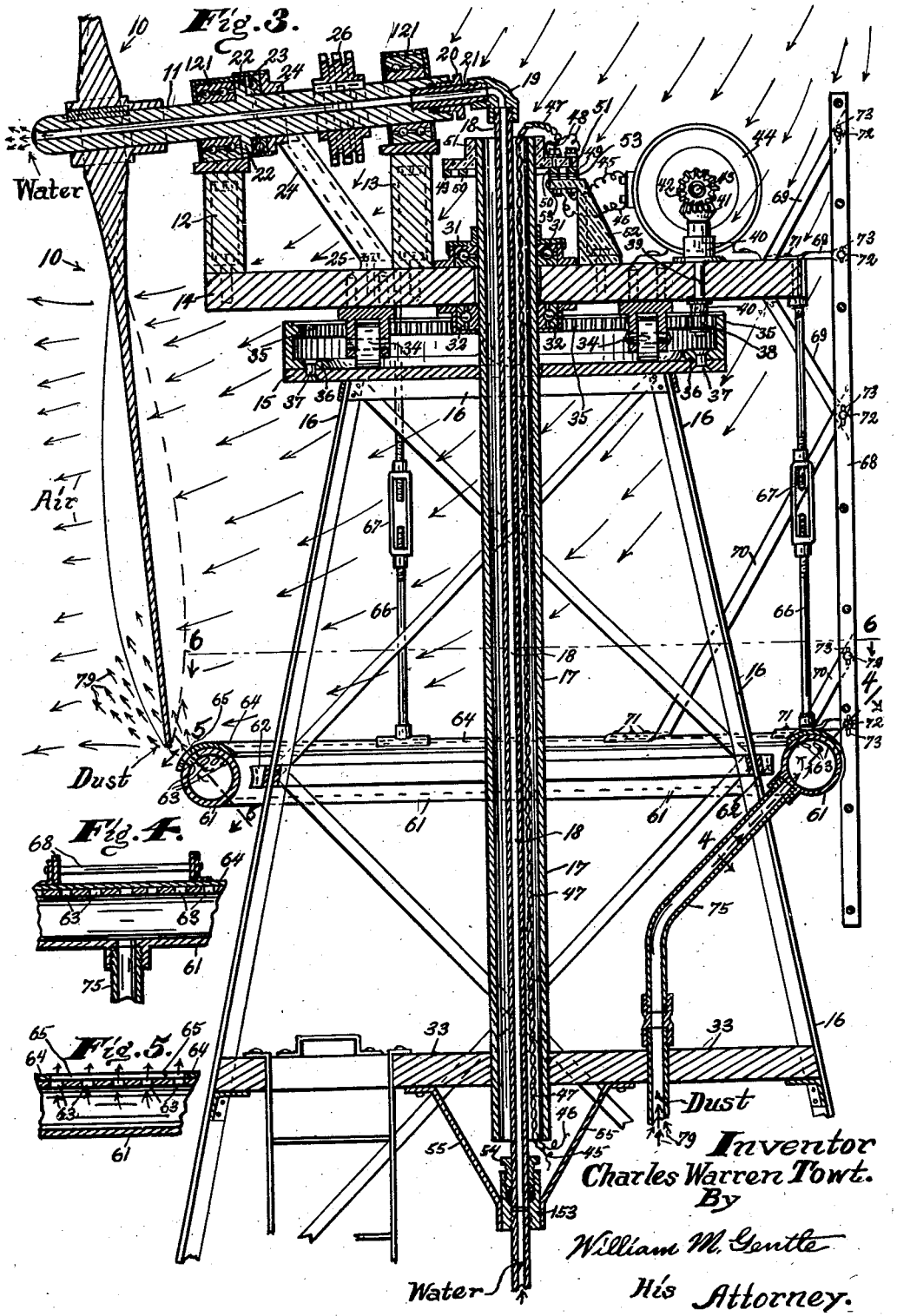

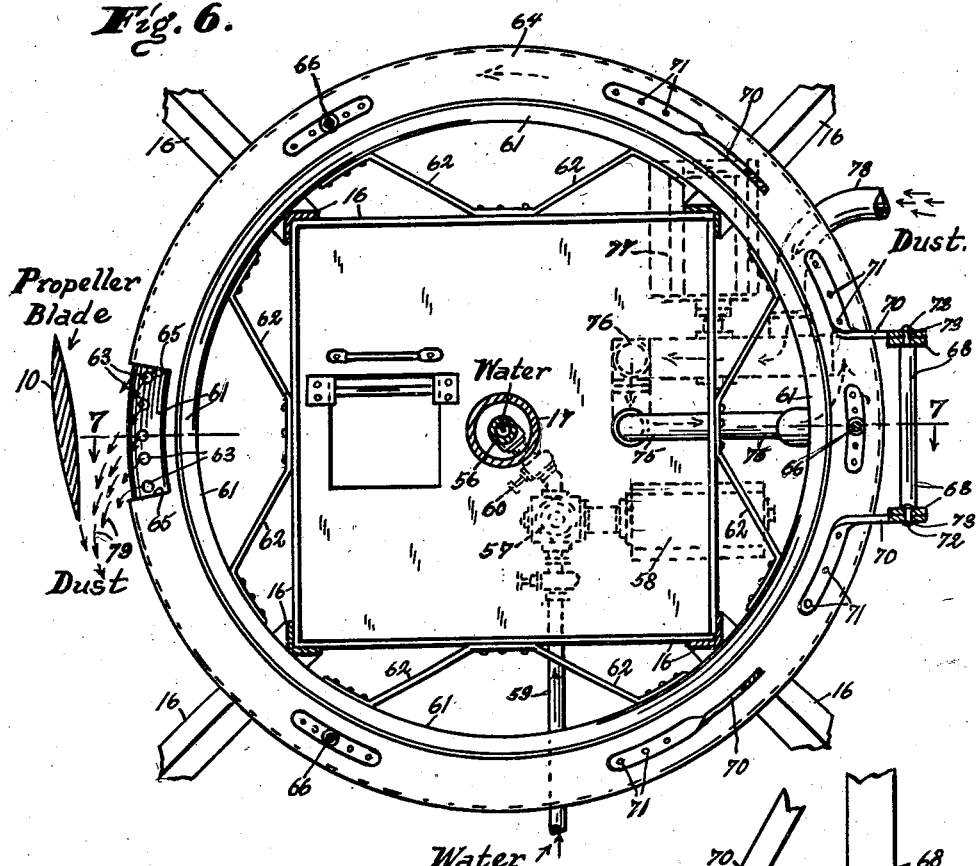
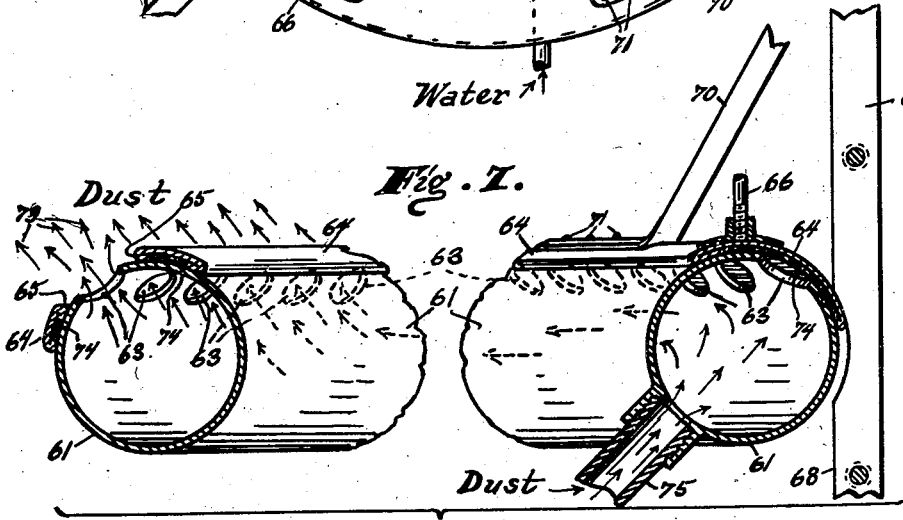
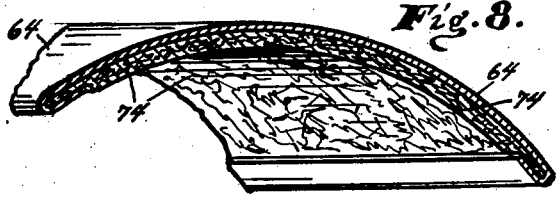

Patented Mar. 5, 1935

1,993,635

UNITED STATES PATENT OFFICE 1,993,635

APPARATUS FOR PREVENTING DAMAGE TO VEGETATION BY FROSTING AND SUN-BURNING TEMPERATURES

Charles Warren Towt, Los Angeles, Calif.

Application August 8, 1933, Serial No. 684,174
Renewed January 23, 1935

11 Claims. (Cl. 47—2)

This invention relates to improvements that I have made on my apparatus for preventing frost damage to vegetation on which Patents Nos. 1,848,398 and 1,903,615 were granted to me on March 8, 1932 and April 11, 1933 respectively; and these improvements relate principally to means for displacing air over a wide area and charging the driven air with either water or dust or with both water and dust for the purpose of preventing either frosting or sun-burning temperatures from damaging the vegetation; and also to prevent insects and their larvæ from injuring the vegetation.

This application for United States Letters Patent is a companion of my application for a patent for a Process of protecting vegetation from damage by frosting or sun-burning temperatures, filed August 8, 1933, Serial Number 684,173, and claims only the mechanical features of the apparatus that I employ in my process. In the drawings that accompany the process application only such features of the apparatus are shown as are necessary to a clear understanding of the process; and in this application the drawings show sufficient detail to clearly support the claims.

The principal object of this invention is to provide a very simple means for moistening the vegetation with a relatively fine mist that will aid greatly in preventing frost damage to the vegetation during a frosting period and also will prevent the fruit and foliage from sun-burning. Also this moisture can be charged with chemicals suitable for destroying insects and their larvæ.

Another feature of invention is shown in providing means for covering the vegetation with dust that can also be charged with chemicals, which dusting means can be employed alone or after the moisture has been used, or both moisture and dust can be used together.

A feature of invention is shown in the construction of my propeller and its mounting whereby I am able to displace an extensive area of air over and through the vegetation, with means for continually changing the direction in which the air is driven; in addition to which I utilize the propeller shaft for charging the driven air with moisture.

Another feature of invention is shown in utilizing my propeller to draw dust out of an annular bin and dispense it through the driven air so the dust will settle on the vegetation.

Another feature of invention is shown in providing my dust bin with a plurality of upwardly and outwardly inclined discharge ports through which the dust can be drawn by suction; and also a feature of invention is shown in providing an annular slotted hood to normally cover all of the ports except those in register with the slot in the hood.

Other objects, advantages and features of invention may appear from the accompanying drawings, the subjoined detailed description and the appended claims.

The accompanying drawings illustrate the invention, in which:

Figure 1 is a perspective view of an apparatus that is constructed in accordance with this invention showing it in operation in an orchard, also showing the directions of the circulating air by arrows.

Fig. 2 is a fragmental side view of the upper portion of a tower on which my propeller and rotary platform are mounted and by three sets of arrows indicating the movement of air, water and dust, with parts omitted and others shown fragmentally and diagrammatically.

Fig. 3 is a fragmental central vertical section through the upper portion of the tower showing in detail the means for charging the driven air with water and dust.

Fig. 4 is a fragmental section on line 4—4, Fig. 3, showing the ports from the annular dust bin closed by the sliding hood.

Fig. 5 is a fragmental section on line 5—5, Fig. 3, showing some of the ports in the dust bin open to the outer air through an elongated slot in the sliding hood.

Fig. 6 is an enlarged cross section on the line 6—6, Fig. 3, showing how the annular bin is secured stationarily to the tower and also showing the annular hood slidably and revolubly mounted on the bin with a slot therethrough arranged to expose a number of the discharge ports that extend upwardly and outwardly through the wall of the bin; also showing how suction from the propeller blade draws the dust out of the discharge ports.

Fig. 7 is an enlarged fragmental section on line 7—7, Fig. 6, and on the right showing the hood closing a number of the discharge ports in the bin; and on the left showing a number of the ports open to the outer air through a slot in the revolving sliding hood.

Fig. 8 is an enlarged fragmental section through a portion of the hood showing its interior covered with a felt lining to reduce frictional contact with the top surface of the annular bin.

My apparatus includes a propeller 10 that is secured on the outer end of a hollow shaft 11 that is mounted on the bearing blocks 12 and 13 that are secured on the top of a revolving platform 14. The platform 14 is rotatably mounted on the top of a stationary platform 15 that is supported on the top of a tower 16. The tower 16 is preferably erected in an advantageous position in an orchard or field where vegetation is to be protected from frost, sun-burn or the ravages of insects and their larvæ.

Preferably, the bearing blocks 12 and 13 are arranged so the outer end of the shaft 11 is inclined downwardly about eight degrees and its inner end is held adjacent to and above the top open end of the tube 17 that is arranged centrally and vertically in the tower 16 and which preferably forms a center pivot around which platform 14 revolves.

Arranged centrally in the tube 17 is a water-pipe 18 that has its upper end connected to the hollow shaft 11 by a pipe fitting 19 and packing nut 20 so that the shaft 11 can revolve on the pipe extension 21, see Figs. 2 and 3.

The shaft 11 is preferably mounted in the ball-bearings 121 on the blocks 12 and 13, and also this shaft has an integral collar 22 that engages a thrust bearing 23 that is held against the collar by a brace 24 that extends downwardly and inwardly from the shaft to the platform 14 and is secured thereto by bolts 25 shown by dotted lines in Figs. 2 and 3.

The shaft 11 is provided with a sprocket wheel 26 that is connected by a chain 27 with a sprocket wheel 28 on the engine shaft 29, as diagrammatically indicated in Fig. 1, and the engine 30 is also diagrammatically shown in this figure.

Preferably the tube 17 is provided with ball bearings 31 and 32 so the revolving platform 14 can revolve around it. The tube 17 is held stationary in the stationary platforms 15 and 33.

The revolving platform 14 is supported by caster wheels 34 on top of the stationary platform 15 so it can be rotated in a horizontal plane to move the shaft 11 and propeller 10 in a circle around the top of the tower 16.

An internal gear 35 that is of the same diameter as the disk-like platform 15, has an inwardly extending flange 36 that is secured by rivets 37 to the platform so that the gear is held in the exact vertical center of the tower, and meshing with this internal gear is a pinion 38 on a shaft 39 that extends upwardly through the bearings 40 that are secured to the top and bottom sides of the platform 14.

A bevel gear 41 is secured on the upper end of the shaft 39 and it meshes with a gear 42 on the shaft 43 of the electrical motor 44 that is indicated diagrammatically in the drawings.

The electrical wiring to the motor is shown semi-diagrammatically in Fig. 3, and as seen therein the wires 45 and 46 are carried upwardly through the tube 17 by a cord 47 to contacts 48 that are in circuit with the annular rings 49, 50 that are secured to the underside of the insulating support 51 that is secured to the upper end of the tube 17.

An insulating stand 52 is secured to the revolving platform 14 and carries the brushes 53 that engage the rings 49, 50 and carry the electrical current through the motor over the wires 45 and 46, as diagrammatically illustrated.

It is obvious that as the platform 14 is revolved around the stationary tube 17 the brushes 53 will remain in contact with their respective rings 49, 50; also it is obvious that when the motor 44 is driven it will drive the pinion 38 which, in mesh with the annular internal gear 35, will cause the platform to revolve around the tube 17 and carry the propeller 10 and shaft 11 in a circle.

The water-pipe 18 has its lower end fitted into a box 153 so it can revolve with the platform 14, and it is provided with the usual packing nut 54 to prevent leakage.

The box 153 is supported by a bracket 55 under the lower stationary platform 33; and extending into this box 153 is the upper end of a water pipe 56 that has its lower end secured to a pump 57 that is driven by an engine 58 to draw water from a supply pipe 59 and supply it to the hollow shaft 11 when the control valve 60 is open and the engine 58 is operating, see Figs. 1 and 6.

The pipe 59 can be connected to a water supply such as a well, tank or cistern, not shown.

From the foregoing it can be readily seen that when the engine 30, motor 44 and pump engine 58 are driven at the same time, that the propeller 10 will be driven to displace air in an extensive circular area and that water will be forced into and drawn from the shaft 11 to moisten the driven air; and, as previously stated, the motor 44 will turn the platform 14 to point the hollow shaft 11 in all radial directions from the vertical center through the tower so the vegetation in an extensive circular area will not only be greately agitated by the driven air, but will also be moistened by the water discharged from the shaft 11.

In addition to supplying moisture to the driven air I also provide means for charging the air with dust. This means includes an annular dust bin 61 that is secured by spaced arms 62 to the tower adjacent the tip ends of the propeller 10 when they are in their lowest position of rotation. This bin is provided with a plurality of upwardly and outwardly inclined discharge ports 63 that are arranged in a circle, and all of these ports are covered by a hood 64 except those that are exposed through an elongated slot 65 in the hood.

The hood 64 is lightly supported on the top surface of the bin 61 by rods 66 that are connected to and move in a circle with the platform 14; and these rods have turn buckles 67 for adjusting the hood relative to the bin so there is a light sliding contact between them.

The hood 64 is held from excessive vibration in rotation by means of a ladder 68 that has its upper end secured to the rotary platform 14 by braces 69; and has its lower end secured to the hood by braces 70.

As diagrammatically indicated in the drawings and as best shown in Fig. 3, the braces are connected to the platform and hood by rivets 71 and to the ladder by bolts 72 extending through slots 73 so that the braces will not interfere with the adjustment of the hood to the bin.

As indicated in Fig. 7, and semi-diagrammatically shown in Fig. 8, the hood can be lined with a felt or fiber lining 74 to reduce the frictional contact with the bin, and also to more effectively cover the discharge ports 63 when not in use. By means of this connection the hood 64 revolves with the platform 14 and the slot 65 is arranged so it is always opposite the tips of the propeller blades when they are in their lowest position of rotation. In other words, the hood 64 is moved in time with the propeller 10 so its elongated slot 65 will uncover the discharge ports 63 as is necessary to permit suction from the propeller to draw dust from the bin to mix it with the driven air.

Dust is supplied to the bin 61 by a pipe 75 and a blower 76. The blower is operated by an engine 77 to draw dust through a pipe 78 from a source of supply not shown and deliver it to the bin 61 through pipe 75, as stated. The blower 76 and engine 77 are diagrammatically shown in Figs. 1 and 6. It is understood that any suitable engine and blower may be used to supply dust to the bin 61.

When the propeller 10 is being driven and the platform 14 is rotated and the blower 76 is in operation to supply dust to the annular bin 61, suction from the propeller will draw dust through the slot 65 and the uncovered ports 63 and mix it with the driven air, as indicated by the short arrows 79 in Figs. 3, 5, 6 and 7.

From the foregoing it can be readily seen that I can use the driven air alone to sway the vegetation over an extensive area to prevent damage thereto by either frosting or sun-burning temperatures; and also it can readily be seen that I can charge the driven air with either water or dust or with both water and dust for the foregoing purposes.

It is also obvious that I can add the proper chemicals to both the water and dust to destroy insects and their larvae that may be injuring the vegetation.

My apparatus is built and operated as hereinbefore fully described.

What I claim as my invention is:

1. An apparatus for preventing damage to vegetation including a tower, a platform thereon, a hollow shaft rotatably mounted on said platform and arranged so its outer end is inclined downwardly and extended beyond the outer edge of said platform and its inner end adjacent the center vertical axis of said tower, a propeller on the outer end of said shaft, a water pipe arranged centrally and vertically in said tower, a connection between said water pipe and hollow shaft, means for driving water up through said pipe and out of the outer end of said shaft, and other means for driving said shaft.

2. An apparatus for preventing damage to vegetation, including a tower, a revolving platform thereon, a hollow shaft mounted on said platform, a propeller on the outer end of said shaft, means for discharging water into the inner end of said shaft so that suction from said propeller will draw the water out of the outer end of said shaft into the driven air, and other means for rotating said shaft to drive said propeller.

3. An apparatus for preventing frost damage to vegetation including a revolvable platform, a hollow shaft revolvably mounted thereon that has its outer end inclined downwardly and extended beyond the outer edge of said platform, a tower for supporting said platform and shaft above a field of vegetation, a pump for forcing water into the inner end of said shaft, a propeller on the outer end of said shaft for driving the air and drawing the water out of the outer end of said shaft and mixing it with the driven air, and means for rotating said platform to turn said shaft in a circle so that it successively points in all radial directions from the center of said tower.

4. An apparatus for preventing damage to vegetation including a tower, a revolving platform thereon, a hollow shaft extended radially from said platform, a propeller on the outer end of said shaft for driving the air to agitate the vegetation, means for driving said shaft, and other means for supplying water to the inner end of said shaft so it is drawn out to saturate the driven air and moisten the vegetation.

5. An apparatus for preventing damage to vegetation, including a tower, a revolving platform thereon, a hollow shaft mounted on said platform so it extends radially from the vertical center thereof, a propeller secured to the outer end of said shaft, a water pipe extended into the inner end of said shaft, a pump for driving water into said shaft, and an engine for rotating said shaft to actuate said propeller to drive air over and through the vegetation to agitate it during the periods of frosting and sun-burning temperatures, said parts arranged so that suction from said propeller will draw the water from said shaft and mix it with the driven air to moisten the vegetation.

6. An apparatus for preventing damage to vegetation, incuding a tower, a stationary platform secured on the top of said tower, an annular internal gear secured in a fixed position thereon, a revolving platform, caster wheels for supporting said revolving platform above said stationary platform, a pinion carried by said revolving platform that meshes with said fixed internal gear, a motor for driving said pinion to rotate said revolving platform, and means on said revolving platform for driving air over and through the vegetation, and other means for saturating the driven air to moisten the vegetation.

7. In an apparatus for preventing damage to vegetation, the combination with a propeller supported above a field of vegetation and actuated to drive air over and through the vegetation, means for saturating the driven air to moisten the vegetation; of means whereby said propeller distributes dust over the vegetation after it is moistened.

8. In an apparatus for preventing damage to vegetation, the combination with a propeller mounted on a hollow shaft and supported above a field of vegetation, an engine for actuating said propeller to drive air over and through the vegetation to agitate it, a water-pipe for supplying water to said hollow shaft whereby suction from said propeller draws it out of said hollow shaft and distributes it through the driven air to moisten the vegetation, of means including a dust bin arranged under said propeller so that suction therefrom will draw the dust from said bin and mix it with the driven air to thereby distribute it over the vegetation.

9. In an apparatus for preventing damage to vegetation the combination with a propeller supported above a field of vegetation and actuated to drive air over and through the vegetation, means for saturating the driven air to moisten the vegetation, of an annular dust bin arranged under said propeller with upwardly and outwardly extending ports therefrom, a slotted hood arranged over the ports in said bin that is operated to consecutively open the ports so that said propeller will draw dust from said bin through the ports that are in register with the slot in said hood.

10. In an apparatus for preventing damage to vegetation, the combination with a tower, a revolving platform thereon, a shaft extended radially from the center thereof, a propeller on the outer end of said shaft, an engine for driving said shaft to actuate said propeller so it will drive the air over and through the vegetation, a motor for rotating said platform to turn said shaft in a circle, of an annular dust bin secured to said tower below said propeller, said bin having upwardly and outwardly arranged discharge ports that extend in a circle around said tower, a hood slidably supported on said bin and having an elongated slot therethrough, an adjustable connection between said revolving platform and hood whereby the latter is moved in time therewith so its elongated slot will consecutively uncover a number of the discharge ports from said bin so that suction from said propeller will draw dust from said bin through the elongated slot in said hood and distribute it over the vegetation.

11. The combination set forth in claim 10, and a blower for supplying dust to said annular bin.

CHARLES WARREN TOWT.